United States Patent [19]

Yagi et al.

[11] Patent Number: 4,489,686
[45] Date of Patent: Dec. 25, 1984

[54] TORCH IGNITION TYPE INTERNAL COMBUSTION ENGINE

[75] Inventors: Shizuo Yagi; Isao Fujii; Yoshio Ajiki, all of Saitama, Japan

[73] Assignee: Honda Giken Kogyo Kabushiki Kaisha, Tokyo, Japan

[21] Appl. No.: 398,432

[22] Filed: Jul. 14, 1982

[30] Foreign Application Priority Data

Jul. 23, 1981 [JP] Japan ............................ 56-115542
Aug. 1, 1981 [JP] Japan ............................ 56-120828

[51] Int. Cl.³ ............................................. F02B 19/12
[52] U.S. Cl. ..................................... 123/260; 123/287; 123/291; 123/293
[58] Field of Search ............... 123/286, 293, 291, 661, 123/289, 260, 287

[56] References Cited

U.S. PATENT DOCUMENTS

| | | | |
|---|---|---|---|
| 1,833,445 | 11/1931 | Summers | 123/260 |
| 2,173,081 | 9/1939 | Barkeij | 123/275 |
| 2,314,175 | 3/1943 | Summers | 123/277 |
| 3,924,590 | 12/1975 | Miyaki et al. | 123/274 |
| 3,967,595 | 7/1976 | Yagi et al. | 123/260 |
| 4,127,089 | 11/1978 | Tsutsumi | 123/255 |
| 4,175,532 | 11/1979 | Kato | 123/287 |
| 4,182,284 | 1/1980 | Yagi et al. | 123/293 |
| 4,182,287 | 1/1980 | Yagi et al. | 123/260 |
| 4,237,826 | 12/1980 | Motosugi et al. | 123/287 |
| 4,344,408 | 8/1982 | Inoue et al. | 123/661 |

FOREIGN PATENT DOCUMENTS

| | | | |
|---|---|---|---|
| 54-38423 | 3/1979 | Japan | 123/286 |
| 595529 | 2/1978 | U.S.S.R. | 123/286 |

*Primary Examiner*—Andrew M. Dolinar
*Attorney, Agent, or Firm*—Lyon & Lyon

[57] ABSTRACT

An internal combustion piston engine of the torch ignition type employs an auxiliary combustion chamber connected by a torch passage to a compact main combustion chamber. A spark plug has electrodes located adjacent the upstream end of the torch passage and remote from the intake valve for the auxiliary combustion chamber. At least one suction conduit intersects the torch passage between its ends and extends from a peripheral zone of the main combustion chamber. This zone may comprise a squish zone which increases flow of air-fuel mixture into the torch passage to follow the torch flame into the main combustion chamber. A cavity in the engine head may receive the torch flame from one or more torch passages.

12 Claims, 9 Drawing Figures

TORCH IGNITION TYPE INTERNAL COMBUSTION ENGINE

This invention relates to internal combustion piston engines of the torch ignition type. A main combustion chamber receives a relatively lean mixture, and an auxiliary combustion chamber receives a relatively rich mixture. A torch passage connects the two combustion chambers. A spark plug ignites the mixture in the auxiliary combustion chamber at or near the end of the compression stroke, and the burning mixture is projected through the torch passage to ignite the relatively lean mixture in the main combustion chamber. Engines of this general type have been widely used in automobiles in recent years in order to reduce the pollutants HC, CO and $NO_x$ in the exhaust gases.

The general object of the present invention is to preserve the feature of reduced pollutants in the exhaust gases while at the same time improving fuel economy and increasing power output, all without causing the objectionable phenomenon of "knocking".

Knocking, in an internal combustion piston engine, is believed to be caused by the abrupt combustion of the final burning portion, i.e., the end gas due to flame propagation in the air-fuel mixture. Several means of restraining such knocking are known, including, for example:

(1) Reducing the temperature and pressure of the combustion gas;
(2) Promoting the cooling process of the walls of the combustion chamber, especially the end gas portion;
(3) Increasing the flame speed to accelerate the combustion speed;
(4) Shortening the distance of flame propagation.

The foregoing known methods of reducing knocking are employed in the embodiments of the present invention through novel use of the following inventive features:

(a) The main combustion chamber is given a new compact shape;
(b) One or more suction conduits leading from the main combustion chamber intersect the torch passage or passages;
(c) The electrodes of the spark plug are located in a new position with respect to the auxiliary combustion chamber and the torch passage.

These improvements add significantly to the known characteristics of the torch ignition engine to minimize knocking, while at the same time improving the power output and improving fuel economy.

Another object of the present invention is to provide an internal combustion piston engine of the torch ignition type which runs quietly and smoothly by reducing combustion noises. Such noises are not related to knocking but are known to indicate no disadvantageous influence on the engine performances.

Other objects and advantages will apear hereinafter.

Figure 1:
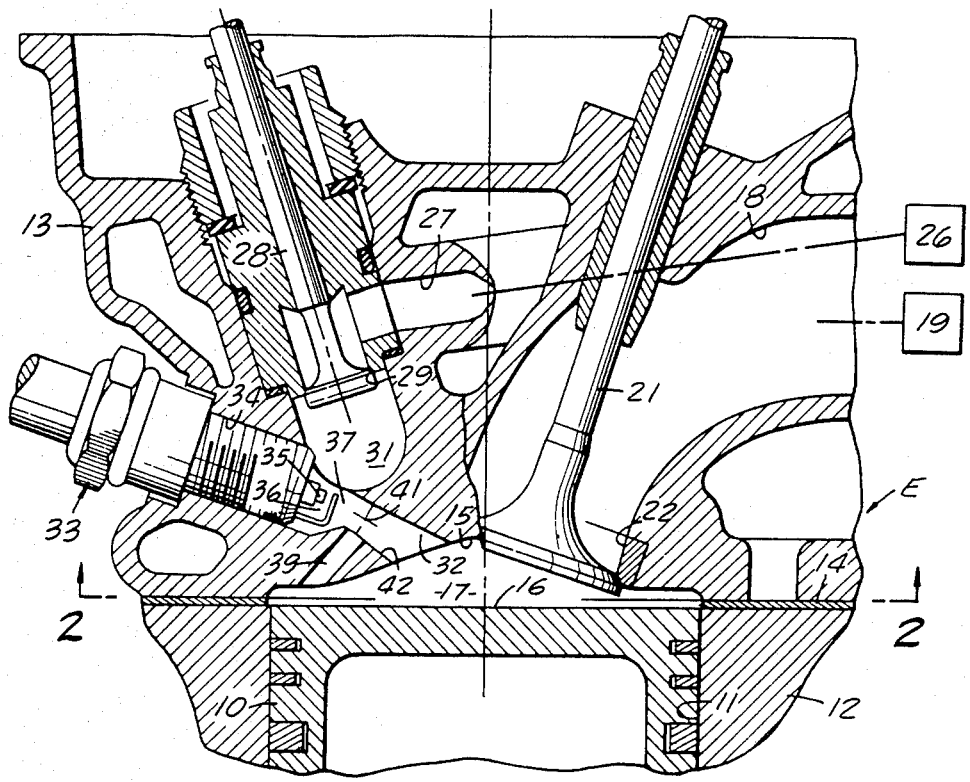
FIG. 1 is a sectional elevation showing a preferred embodiment of this invention.

Referring to the drawings, the engine generally designated E includes a reciprocating piston 10 slidably mounted in a cylinder bore 11 in the engine block 12. A cylinder head 13 is fixed in position with respect to the engine block 12, and a gasket 14 is interposed between them. A cavity 15 formed in the head 13 cooperates with the top surface 16 of the piston 10 to form a main combustion chamber 17. The combustion chamber 17 is compact in that the major portion of its volume is confined within a region substantially less than the diameter of the cylinder bore 11.

Figure 2:
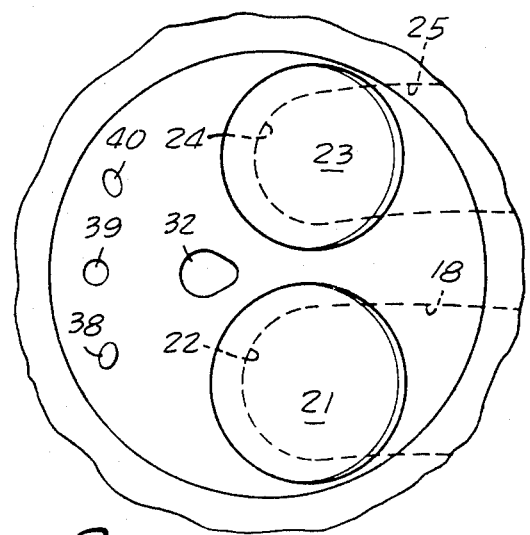
FIG. 2 is a view taken substantially on the lines 2—2 as shown in FIG. 1, partly broken away.
Figure 3:
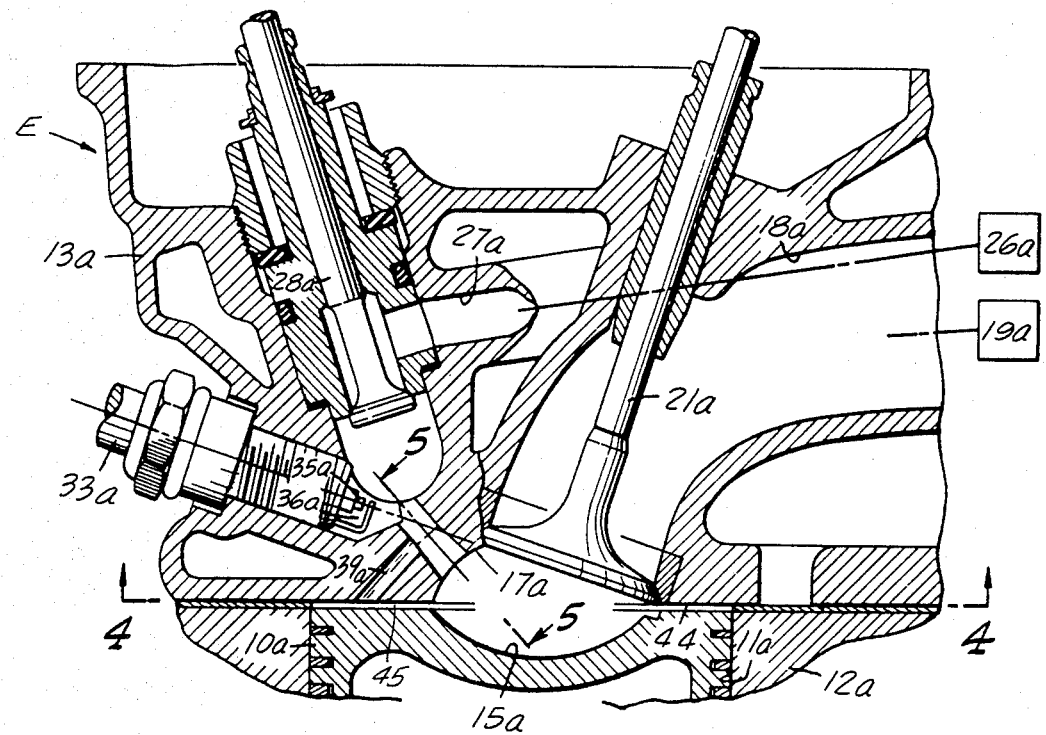
FIG. 3 is a sectional elevation similar to FIG. 1, showing a modification.
Figure 4:
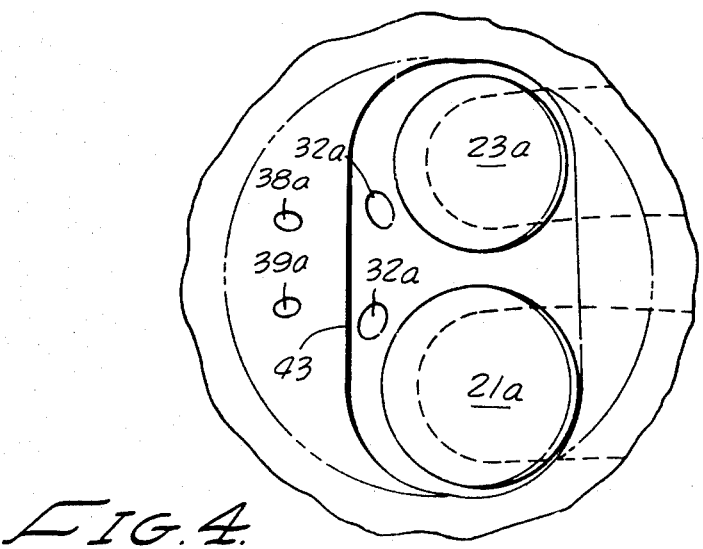
FIG. 4 is a view taken substantially on the lines 4—4 as shown in FIG. 3, partly broken away.
Figure 6:
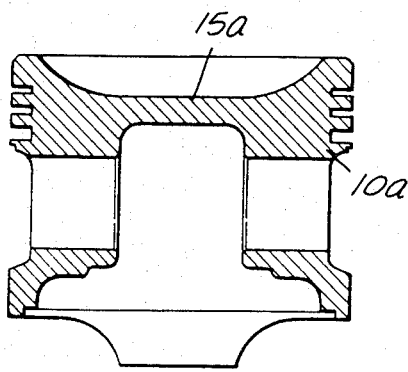
FIG. 6 is a sectional elevation of the piston shown in FIG. 3.
Figure 7:
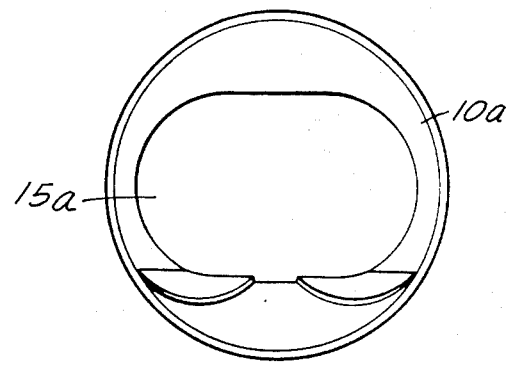
FIG. 7 is a top plan view of said piston.

An intake passage 18 is formed in the head 13 and receives a relatively lean air-fuel mixture from a first carburetor 19. Flow through the passage 18 is controlled by the main intake valve 21 which closes against a stationary seat 22. As shown in FIG. 2, an exhaust valve 23 is also provided in the head 13 and closes against the valve seat 24 to control flow of exhaust gases through the passage 25.

A second carburetor 26 is provided for supplying a relatively rich air-fuel mixture to the auxiliary intake passage 27. Flow of this relatively rich mixture is controlled by the auxiliary intake valve 28 which closes against the valve seat 29. Rich mixture enters the auxiliary combustion chamber 31 when the auxiliary intake valve 28 is open the auxiliary combustion chamber 31 has a cup-shaped end opposite the location of and spaced from the auxiliary intake valve 28. A torch opening 32 intersects the cup-shaped end and connects the auxiliary combustion chamber 31 to the main combustion chamber 17. A spark plug 33 connected by threads 34 to the head 13 has electrodes 35 positioned within the plug chamber 36. The upstream end 37 of the torch passage 32 intersects and communicates with the plug chamber 36 and with the auxiliary combustion chamber 31.

In accordance with this invention, suction passages are provided which extend from a peripheral zone of the main combustion chamber 17 and which intersect the torch passage between its ends. As shown in the drawings, the suction conduits 38, 39 and 40 are positioned in the cylinder head 13 an each extends at an angle to intersect the torch passage 32 near the boundary 41 between the tapered portion 42 of the torch passage and the cylindrical portion adjacent its upstream end 37. The position of the electrodes 35 is such that the flame kernel, upon ignition, is not blown out by the rush of air-fuel mixture through the suction conduits at the end of the compression stroke. The diameter of each of the suction conduits 38, 39 and 40 is less than the minimum diameter of the torch passage 32. The distance from the upstream end of the torch passage 32 to the spark plug electrodes 35 is substantially less than that to the sealing surfaces of the auxiliary intake valve 28.

In the operation of the engine E, the suction stroke of the piston 10 draws into the main combustion chamber 17 a relatively lean mixture through the intake passage 18, and a relatively rich mixture through the intake passage 27, both the main intake valve 16 and the auxiliary intake valve 28 being open. Toward the end of the following compression stroke of the piston 10 the spark plug electrodes 35 ignite first the mixture in the plug chamber 36 which in turn ignites the mixture in the auxiliary combustion chamber 31. A strong torch flame is then projected through the torch passage 32 into the center of the main combustion chamber 17. The movement of the burning air-fuel mixture through the torch passage 32 aspirates a flow of air-fuel mixture in the peripheral portion of the main combustion chamber through the suction conduits 38, 39 and 40 into the torch passage. This mixture follows the flame to achieve more complete combustion. Furthermore, this flow of mixture through the suction conduits into the torch passage is intensified by the rise in pressure in the main combustion chamber 17 caused by burning of the mixture therein. This return flow through the suction conduits restrains the rise in temperature and pressure in the main combustion chamber 17, thereby restraining the unwanted phenomenon of "knocking". Moreover, the flow through the suction conduits causes more complete burning of the mixture in the main combustion chamber, with the result that emissions of CO and HC are reduced.

By directing the torch passage 32 toward the center portion of the main combustion chamber 17 it is possible to reduce the flame propagation distance for burning the mixture in all portions of the expanding combustion chamber. This action further restrains the knocking phenomenon.

During the suction stroke of the piston 10, relatively rich air-fuel mixture is drawn through the auxiliary combustion chamber 31 and into the main combustion chamber 17. During the following compression stroke of the piston 10, part of this relatively rich mixture, made leaner by the relatively lean air-fuel mixture from the main combustion chamber, is forced back into the auxiliary chamber 31. The resulting mixture in the auxiliary chamber 31 and plug chamber 36 is substantially stoichiometric. High turbulence is generated in these mixtures. This ideal mixture is readily ignited by the spark plug electrodes. The resulting burning flame propagates into the highly turbulent auxiliary combustion chamber 31 and into the main combustion chamber 17 through the torch passage 32. At this instant, the burning flame passing through the torch passage 32 contains little unburned rich mixture and is so projected into the main combustion chamber 17 as to follow the preceding burned mixture. As a result, the combustion of the mixture in the main combustion chamber 17 is smoothly effected without substantial turbulence, so that generation of the tell-tale combustion noises is remarkably reduced, while at the same time restraining the knocking phenomenon.

Figure 5:
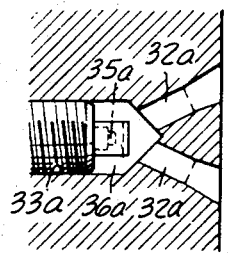
FIG. 5 is a sectional detail taken substantially on the lines 5—5 as shown in FIG. 3.

In the modified form of the invention shown in FIGS. 3-7, the parts of the device are similarly positioned and carry the same identifying numbers, with the suffix "a". The top surface of the piston 10a is not flat but is provided with a recess 15a. Also the underside of the cylinder head is formed as an oval-shaped cavity 43 in an otherwise flat portion 44 of the cylinder head above the piston 10. A squish zone 45 is thus formed between the piston and cylinder head, encircling the main combustion chamber. The main intake valve 21a and the exhaust valve 23a both open into this cavity 43. Two torch passages 32a are symmetrically positioned in the head 13a and discharge into the recess 43a. And their upstream ends are open to the auxiliary combustion chamber 31a and the plug chamber 36a, respectively. Each torch passage 32a is intersected by one suction conduit 38a, 39a, each extending from the squish zone 45. A single spark plug 33a has its eletrodes 35a positioned in the plug chamber 36a. The longitudinal axes of the torch passages 32a are not directed toward the electrodes 35a. The electrodes 35a are positioned outside the projection of the upstream ends of the torch passages 32a. Thus, the flame kernel, upon ignition, is not blown out by the ruch of mixture flowing from the main combustion chamber 17a into the torch passages 32a near the end of the compression stroke of the engine. The torch passages 32a diverge from this single plug chamber 36a, as best shown in FIG. 5. The compact shape of the main combustion chamber 17a is improved by the modified form of the invention shown in FIGS. 3-7. As before, the distance from the upstream ends 37a of the torch passages 32a to the spark plug electrodes is less than the distance to the sealing surfaces of the auxiliary intake valve 28a. The modified form of the invention shown in FIG. 8 employs an ovaloid cavity 46 in the head, which cavity is in the general shape of a double lobe. A single torch opening 32b discharges symmetrically into this cavity 46 as do suction conduits 38b, 39b and 40b which intersect the torch opening 32b between its ends, and these suction conduits extend from the squish zone 45c of the engine head above the piston.

Figure 8:
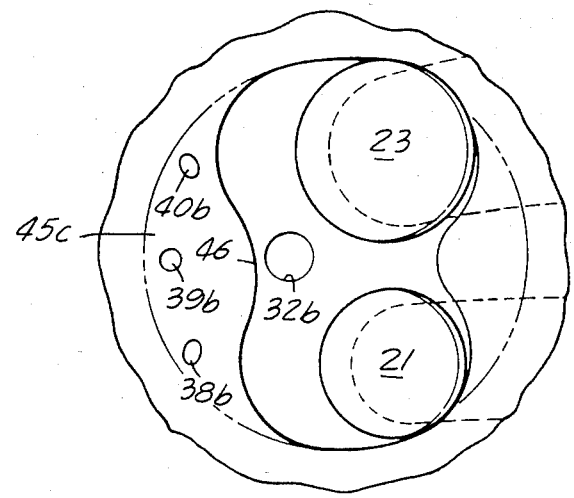
FIG. 8 is a view similar to FIG. 4 showing another modification.
Figure 9:
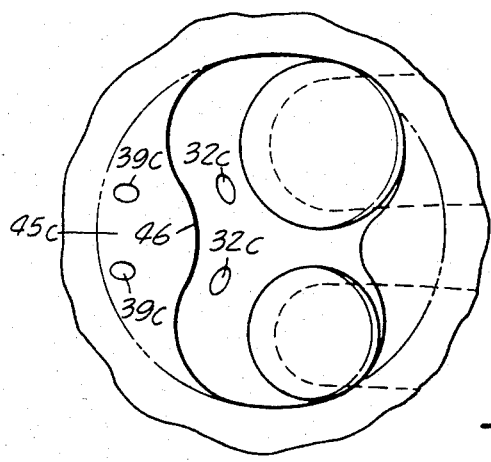
FIG. 9 is a view similar to FIG. 4 showing another modification.

In the modified form of the invention shown in FIG. 9, a cavity 47 is provided which is of similar shape to that shown in FIG. 8. Two torch passages 32c are provided, as in FIG. 4, and each is intersected by a suction conduit 39c extending from the squish zone 45c.

The operation of the modifications of FIGS. 8 and 9 is the same as that previously described.

Having fully described our invention, it is to be understood that we are not to be limited to the details herein set forth but that our invention is of the full scope of the appended claims.

We claim:

1. In an internal combustion piston engine having a main combustion chamber and an auxiliary combustion chamber connected by a torch passage, the improvement comprising, in combination: at least one main intake valve for supplying the main combustion chamber with a relatively lean air-fuel mixture, an auxiliary intake valve for supplying the auxiliary combustion chamber with a relatively rich air-fuel mixture, said auxiliary combustion chamber having a cup-shaped end spaced from and opposite the location of said auxiliary intake valve, said torch passage intersecting said auxiliary combustion chamber only at a curved portion of said cup-shaped end for communicating with said auxiliary combustion chamber, a spark plug having electrodes located in a space adjacent the said intersection between and communicating with said cup-shaped end of said auxiliary combustion chamber and said torch passage, said spark plug electrodes located outside of the torch passage for providing an unobstructed torch passage between said auxiliary combustion chamber and said main combustion chamber, the distance from the upstream end of the torch passage to said electrodes being substantially less than that to said auxiliary intake valve, at least onesuction conduit intersecting the torch passage between its ends and extending from a peripheral zone of the main combustion chamber, whereby movement of burning air-fuel mixture through the torch passage aspirates a flow of air-fuel mixture from the main combustion chamber through said suction conduit and into the torch passage.

2. In an internal combustion piston engine having a main combustion chamber and an auxiliary combustion chamber connected by a torch passage, the improvement comprising, in combination: a first carburetor, at least one main intake valve for supplying the main combustion chamber with a relatively lean air-fuel mixture from said first carburetor, a second carburetor, a auxiliary intake valve for supplying the auxiliary combustion chamber with a relatively rich air-fuel mixture from said second carburetor, said auxiliary combustion chamber having a cupshaped end spaced from and opposite the location of said auxiliary intake valve, said torch passage intersecting said auxiliary combustion chamber only at a curved portion of said cup-shaped end for communicating with said auxiliary combustion chamber, a spark plug having electrodes located in a space adjacent the said intersection between and communicating with said cup-shaped end of said auxiliary combustion chamber and said torch passage, said spark plug electrodes located outside of the torch passage for providing an unobstructed torch passage between said auxiliary combustion chamber and said main combustion chamber, the distance from the upstream end of the torch passage to said electrodes being substantially less than that to said auxiliary intake valve, at least one suction conduit intersecting the torch passage between its ends and extending from a peripheral zone of the main combustion chamber, whereby movement of burning air-fuel mixture through the torch passage aspirates a flow of air-fuel mixture from the main combustion chamber through said suction conduit and into the torch passage.

3. In an internal combustion piston engine having a main combustion chamber and an auxiliary combustion chamber connected by a touch passage with at least one main intake valve for supplying the main combustion chamber with a relatively lean air-fuel mixture and an auxiliary intake valve at one end of the auxiliary combustion chamber for supplying it with a relatively rich air-fuel mixture, the auxiliary chamber having a cup-shaped end opposite the auxiliary intake valve, and a spark plug, the improvement comprising; the torch passage intersecting said auxiliary combustion chamber only at a curved portion of the cup-shaped end of and communicating with the auxiliary combustion chamber, the spark plug having electrodes located in a space adjacent the said intersection between and communicating with said cup-shaped end of said auxiliary combustion chamber and said torch passage, said spark plug electrodes located outside of the torch passage for providing an unobstructed torch passage between said auxiliary combustion chamber and said main combustion chamber, and the distance from the upstream end of the torch passage to said electrodes being substantially less than that to said auxiliary intake valve.

4. The internal combustion engine of claim 3 wherein at least one suction conduit intersects the torch passage between its ends and extends from a peripheral zone of the main combustion chamber, whereby movement of burning air-fuel mixture through the torch passage aspirates a flow of air-fuel mixture from the main combustion chamber through said suction conduit and into the torch passage.

5. In an internal combustion piston engine having a main combustion chamber and an auxiliary combustion chamber connected by a torch passage, the improvement comprising, in combination: at least one main intake valve for supplying the main combustion chamber with an air-fuel mixture, an auxiliary intake valve for supplying the auxiliary combustion chamber with an air-fuel mixture, said auxiliary combustion chamber having a cup-shaped end spaced from and opposite the location of said auxiliary intake valve, said torch passage intersecting said auxiliary combustion chamber only at a curved portion of said cup-shaped end for communicating with said auxiliary combustion chamber, a spark plug having electrodes located in a space adjacent the said intersection between and communicating with said cup-shaped end of said auxiliary combustion chamber and said torch passage, said spark plug electrodes located outside of the torch passage for providing an unobstructed torch passage between said auxiliary combustion chamber and said main combustion chamber, the distance from the upstream end of the torch passage to said electrodes being substantially less than that to said auxiliary intake valve, at least one suction conduit intersecting the torch passage at its minimum cross section and extending from a peripheral zone of the main combustion chamber, whereby movement of burning air-fuel mixture through the torch passage aspirates a flow of air-fuel mixture from the main combustion chamber through said suction conduit and into the torch passage.

6. In an internal combustion engine having a piston slidably mounted in a cylinder and cooperating with a cylinder head to form a main combustion chamber, the combination of: an auxiliary combustion chamber provided in the cylinder head and connected by a torch passage to the main combustion chamber, a squish zone provided between the piston and the cylinder head, at least one main intake valve for supplying the main combustion chamber with a relatively lean air-fuel mixture, an auxiliary intake valve for supplying the auxiliary combustion chamber with a relatively rich air-fuel mixture, said auxiliary combustion chamber having a cup-shaped end spaced from and opposite the location of said auxiliary intake valve, said torch passage intersecting said auxiliary combustion chamber only at a curved portion of said cup-shaped end for communicating with said auxiliary combustion chamber, a spark plug having electrodes located in a space adjacent the said intersection between and communicating with said cupshaped end of said auxiliary combustion chamber and said torch passage, said spark plug electrodes located outside of the torch passage for providing an unobstructed torch passage between said auxiliary combustion chamber and said main combustion chamber, the distance from the upstream end of the torch passage to said electrodes being substantially less than that to said auxiliary intake valve, at least one suction conduit intersecting the torch passage between its ends and extending from the squish zone of the main combustion chamber, whereby movement of burning air-fuel mixture through the torch passage and pressure from said squish zone causes a flow of air-fuel mixture from the main combustion chamber through said suction conduit and into the torch passage.

7. In an internal combustion engine having a piston slidably mounted in a cylinder and cooperating with a cylinder head to form a main combustion chamber, the combination of: an auxiliary combustion chamber provided in the cylinder head and connected by a torch passage to the main combustion chamber, a squish zone provided between the piston and the cylinder head, at least one main intake valve for supplying the main combustion chamber with an air-fuel mixture, an auxiliary intake valve for supplying the auxiliary combustion chamber with an air-fuel mixture, said auxiliary combustion chamber having a cup-shaped end spaced from and opposite the location of said auxiliary intake valve, said torch passage intersecting said auxiliary combustion chamber only at a curved portion of said cup-shaped end for communicating with said auxiliary combustion chamber, a plug chamber formed in the cylinder head and communicating both with the cup-shaped end of the auxiliary combustion chamber and with said torch passage at said intersection, a spark plug having electrodes positioned within said plug chamber, said spark plug electrodes located outside of the torch passage for providing an unobstructed torch passage between said auxiliary combustion chamber and said main combustion chamber, the distance from the upstream end of the torch passage to said electrodes being subtantially less than that to said auxiliary intake valve, at least one suction conduit intersecting the torch passage between its ends and extending from the squish zone of the main combustion chamber, whereby movement of burning air-fuel mixture through the torch passage and pressure from said squish zone causes a flow of air-fuel mixture from the main combustion chamber through said suction conduit and into the torch passage.

8. The combination set forth in claim 7 in which a plurality of torch passages extend from the plug chamber to spaced locations in said main combustion chamber, each torch passage being intersected by one suction conduit extending from the squish zone.

9. The combination set forth in claim 7 in which a compact main combustion chamber is formed by a cavity in the cylinder head and a recess in the top of the piston, and a plurality of torch passages extending from the plug chamber to spaced locations in said cavity, each torch passage being intersected by one suction conduit extending from the squish zone.

10. In an internal combustion engine, the combination of: a piston slidably mounted in a cylinder and cooperating with a cylinder head to form a main combustion chamber, the cylinder head having a cavity and the piston having a cooperating recess, an auxiliary combustion chamber provided in the cylinder head and connected by a torch passage to said cavity, a squish zone provided between the piston and the cylinder head, at least one main intake valve opening into said cavity for supplying the main combustion chamber with an air-fuel mixture, an auxiliary intake valve for supplying the auxiliary combustion chamber with an air-fuel mixture, said auxiliary combustion chamber having a cup-shaped end spaced from and opposite the location of said auxiliary intake valve, said torch passage intersecting said auxiliary combustion chamber only at a curved portion of said cup-shaped end for communicating with said auxiliary combustion chamber, a spark plug having electrodes located in a space adjacent the said intersection between and communicating with said torch passage and with said cup-shaped end of said auxiliary combustion chamber at said intersection, said spark plug electrodes located outside of the torch passage for providing an unobstructed torch passage between said auxiliary combustion chamber and said main combustion chamber, the distance from the upstream end of the torch passage to said electrodes being substantially less than that to said auxiliary intake valve, at least one suction conduit intersecting the torch passage between its ends and extending from the squish zone of the main combustion chamber, whereby movement of burning air-fuel mixture through the torch passage and pressure from said squish zone causes a flow of air-fuel mixture from the main combustion chamber through said suction conduit and into the torch passage.

11. The combination set forth in claim 10 in which the cavity in the cylinder head is oval in shape.

12. The combination set forth in claim 10 in which the cavity in the cylinder head is ovaloid in shape with two lobes, a single torch passage discharging into the central portion of said cavity, and a plurality of suction conduits extending from said squish zone and intersecting the single torch passage.

* * * * *

UNITED STATES PATENT AND TRADEMARK OFFICE
CERTIFICATE OF CORRECTION

PATENT NO. : 4,489,686

DATED : December 25, 1984

INVENTOR(S) : Shizuo Yagi, Isao Fujii & Yoshio Ajiki

It is certified that error appears in the above-identified patent and that said Letters Patent is hereby corrected as shown below:

```
Column 2, line 51 after head 13 change "an" to --and--.
Column 3, line 53 change "tale" to --tail--.
Column 5, line 9 before "auxil-" change "a" to --an--.
Column 5, line 13 change "cupshaped" to --cup-shaped--.
Column 5, line 37 change "touch" to --torch--.
Column 6, line 46 change "cupshaped" to --cup-shaped--.
Column 7, line 19 change         "subtan-" to --substan--.
```

Signed and Sealed this

Fifteenth Day of October 1985

[SEAL]

Attest:

Attesting Officer

DONALD J. QUIGG

Commissioner of Patents and
Trademarks—Designate